United States Patent
Jung et al.

(10) Patent No.: US 8,355,728 B2
(45) Date of Patent: Jan. 15, 2013

(54) METHOD FOR OPERATING SERVICE UNAVAILABLE MODE OF FEMTO BASE STATION

(75) Inventors: In Uk Jung, Anyang-si (KR); Jin Lee, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/143,476

(22) PCT Filed: Jan. 6, 2010

(86) PCT No.: PCT/KR2010/000078
§ 371 (c)(1),
(2), (4) Date: Jul. 28, 2011

(87) PCT Pub. No.: WO2010/079960
PCT Pub. Date: Jul. 15, 2010

(65) Prior Publication Data
US 2011/0287759 A1    Nov. 24, 2011

Related U.S. Application Data

(60) Provisional application No. 61/142,636, filed on Jan. 6, 2009.

(51) Int. Cl.
*H04W 36/00* (2009.01)
(52) U.S. Cl. .................. 455/444; 455/422.1; 455/561; 455/466; 455/423; 455/435.1
(58) Field of Classification Search ............... 455/422.1, 455/444, 561, 466, 423, 435.1
See application file for complete search history.

(56) References Cited

U.S. PATENT DOCUMENTS

| 2002/0123361 | A1 | 9/2002 | Bae | |
|---|---|---|---|---|
| 2003/0017838 | A1 | 1/2003 | Kayama et al. | |
| 2010/0120438 | A1* | 5/2010 | Kone et al. | 455/444 |
| 2010/0159917 | A1* | 6/2010 | Majmundar et al. | 455/423 |
| 2010/0159991 | A1* | 6/2010 | Fu et al. | 455/561 |

FOREIGN PATENT DOCUMENTS

KR    2002-0056766 A    7/2002

(Continued)

OTHER PUBLICATIONS

Ahmadi et al., "Proposal for IEEE 802.16m Super-Frame Header Design"; Discussion, IEEE C802.16m-08/489r2; XP17633973A; Sep. 8, 2008; pp. 1-12.

(Continued)

*Primary Examiner* — Kwasi Karikari
(74) *Attorney, Agent, or Firm* — Birch, Stewart, Kolasch & Birch, LLP

(57) ABSTRACT

The present invention relates to a broadband wireless access system, and more particularly, to a method for efficiently operating a service unavailable mode of femto base station. The method for operating a service unavailable mode of femto base station in the broadband wireless access system according to one embodiment of the present invention, comprises the steps of: determining whether the preset condition for the operation of a service unavailable mode is satisfied; and broadcasting service unavailable mode information for indicating the state of service unavailable mode of the femto base station in accordance with the result of determination on the preset condition.

5 Claims, 8 Drawing Sheets

FOREIGN PATENT DOCUMENTS

| | | |
|---|---|---|
| KR | 10-2003-0009193 A | 1/2003 |
| WO | WO 2005/006798 A1 | 1/2005 |
| WO | WO 2007/126351 A1 | 11/2007 |
| WO | 2008/103084 A1 | 8/2008 |

OTHER PUBLICATIONS

Ahmadi et al., "Proposal for IEEE 802.16m Super-Frame Header Design"; Discussion, IEEE S802.16m-08/489; XP17616473A; Macau, China; May 2008; pp. 1-12.

Cho et al., "Inter-Working Signal (IWS) for Femtocell Operation"; Discussion, IEEE C802.16m-08/1250r1; XP17634340A; Nov. 6, 2008; pp. 1-16.

Jung et al., "Text for the IEEE 802.16m Amendment on FemtoSON"; Discussion, IEEE C802.16m-09/2010; XP17612970A; Sep. 30, 2008; pp. 1-4.

Kelvin Chou, "HO DG AWD Text Proposal on Intra-16m HO"; Discussion, IEEE C802.16m-09/0912r2; XP17612091A; May 5, 2009; pp. 1-18.

\* cited by examiner

METHOD FOR OPERATING SERVICE UNAVAILABLE MODE OF FEMTO BASE STATION

CROSS REFERENCE TO RELATED APPLICATIONS

This application is the National Phase of PCT/KR2010/000078 filed on Jan. 6, 2010, which claims priority under 35 U.S.C. 119(e) to U.S. Provisional Application No. 61/142,636 filed on Jan. 6, 2009, all of which are hereby expressly incorporated by reference into the present application.

TECHNICAL FIELD

The present invention relates to a broadband wireless access system, and more particularly to a method for effectively operating an out of service (OOS) mode or a service unavailable mode of a femto base station (FBS).

BACKGROUND ART

A femtocell will hereinafter be described in brief.

Femto is a prefix in the metric system, denoting a factor of $10^{-15}$ or 0.000000000000001. Hence a femtocell or FBS refers to an ultra-small indoor Access Point (AP) for low-power home use or office use. Although the term "femtocell" is sometimes interchangeably used with "picocell", the former is used in the sense of a more advanced cell. The femtocell is a small cellular base station (BS) connected to a broadband router and functions to connect $2^{nd}$ Generation (2G) and $3^{rd}$ Generation (3G) voice and data to a backbone network of a mobile communication service provider via the Digital Subscriber Line (DSL).

The above-mentioned femtocell has the following advantages.

Recently, a new research paper has proposed a method for the femtocell to expedite the spread of 3G technology and greatly increase indoor coverage. Up to 2012, it is expected that the number of the femtocell BS users throughout the world will increase to about one hundred and two million, and the number of access points (APs) serving as BSs will also increase to about thirty-two million. According to chief analyst of ABI Research, Stuart Carlaw, "From a technological standpoint, their better in-building coverage for technologies such as WCDMA, HSDPA and EVDO is an incredibly important aspect of service delivery. From a strategic and financial standpoint, the routing of traffic through the Internet Protocol (IP) network significantly enhances network quality and capacity, and reduces the OPEX that carriers expend on backhaul."

Femtocells can expand cell coverage and increase the quality of voice service. Mobile communication service providers are expecting that subscribers may be familiar with 3G by providing data service via femtocells. The femtocells are also called femto base stations (FBSs) or femto Base Transceiver Stations (femto BTSs).

In summary, femtocells offer the following benefits 1) to 4).

1) Cell coverage improvement
2) Infrastructure cost decrease
3) New service offering
4) Fixed Mobile Convergence (FMC) acceleration.

One or more femtocells may be grouped on a service basis or geological area basis. For example, a femtocell group that can access only a specific MS may be referred to as a Closed Subscriber Group (CSG). A femtocell BS (FBS) recognizes a CSG ID of the MS so that it allows access of only the MS subscribed to the CSG.

FIG. 1 illustrates an exemplary network configuration including FBSs.

FBSs are new network entities added to a legacy network. Accordingly, the use of FBSs may bring about additions or modifications to an entire network structure. An FBS may directly access the Internet and function as a BS. Therefore, the FBS can perform almost all functions of a macro BS. In addition, the FBS may relay data from the macro BS to MSs.

In FIG. 1, the network is configured by adding a Femto Network Gateway (FNG) to the legacy network.

Referring to FIG. 1, the FNG may communicate with an Access Service Network (ASN) gateway and a Connectivity Service Network (CSN). The FNG may use an Rx interface for communicating with the ASN and an Ry interface for communicating with the CSN.

An FBS may access directly a Transmission Control Protocol/Internet Protocol (TCP/IP) Internet and receive a service from the CSN via the FNG. An MS connected to the FBS may receive services from the FNG or CSN in relation to IP Multimedia Subsystem (IMS) authentication, etc.

The FBS is connected to a BS or AP via an R1 interface. This means that the FBS may receive a downlink channel from a macro BS. The FBS may also transmit a control signal to the macro BS.

The above-mentioned FBS may be operated in an Out Of Service (OOS) mode (or a service unavailable mode) when a predetermined condition is satisfied. The FBS is unable to provide a normal service during the OOS mode, such that there is needed an effective method that informs an MS of FBS status information before or after the FBS enters the OOS mode.

DISCLOSURE

Technical Problem

An object of the present invention is to provide an effective communication system and a communication method thereof.

Another object of the present invention is to provide a method for allowing an FBS to effectively inform a neighbor MS of an FBS OOS mode operation status.

Another object of the present invention is to provide a method for enabling an FBS to effectively inform a neighbor part of an FBS OOS mode release such that a callback procedure is carried out.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

In order to solve the above-mentioned technical subjects, the present invention aims to provide a method for effectively transmitting and receiving control information in a wireless communication system using multiple carriers.

To achieve these objects and other advantages and in accordance with the purpose of the invention, as embodied and broadly described herein, a method for operating an out of service (OOS) mode of a femto base station (FBS) in a broadband wireless access system includes determining whether a predetermined OOS mode operation condition is satisfied, and broadcasting OOS mode information indicating an OOS mode status of the FBS according to satisfaction or non-satisfaction of the predetermined OOS mode operation condition.

The OOS mode status may include a normal status, an OOS mode operation status in which an air interface service is not provided to a mobile station (MS), a callback status for informing the MS of the returning to the normal status, and an OOS mode initiation status indicating that the FBS enters the OOS mode after a lapse of a predetermined time.

The OOS mode information may be contained in any one of a predetermined Medium Access Control (MAC) message, an OOS signal and interworking signal (IWS) broadcast through a predetermined broadcast channel.

The OOS mode information may include at least one of a bit indicating the OOS mode status and a bit indicating a cause of an OOS mode entry, and the OOS signal may include at least one of OOS start time information in which the FBS enters the OOS mode, OOS duration information in which the FBS is operated in the OOS mode, a list of neighbor base stations (BSs), and a list of recommended BSs.

The predetermined MAC message may be an Advanced Air Interface Self Organizing Network ADVertizement (AAI_SON-ADV) message, and the predetermined broadcast channel is a super frame header (SFH).

In another aspect of the present invention, an out of service (OOS) mode operating method for operating a mobile station (MS) in response to an OOS mode of a femto base station (FBS) in a broadband wireless access system includes receiving OOS mode information indicating OOS mode initiation of the FBS, and performing handover to a neighbor base station (BS) of the FBS.

The OOS mode information may be contained in any one of a predetermined Medium Access Control (MAC) message, an OOS signal and interworking signal (IWS) broadcast through a predetermined broadcast channel.

The OOS mode information may include at least one of a bit indicating the OOS mode status and a bit indicating a cause of an OOS mode entry, and the OOS signal may include at least one of OOS start time information in which the FBS enters the OOS mode, OOS duration information in which the FBS is operated in the OOS mode, a list of neighbor base stations (BSs), and a list of recommended BSs.

The method may further include receiving OOS mode information indicating that the FBS returns to a normal status (i.e., a callback), and performing handover to the FBS.

The OOS mode information indicating the callback of the FBS may be received through an interworking signal (IWS) broadcast from the FBS to a frequency domain of the neighbor BS.

In another aspect of the present invention, a mobile station (MS) includes a processor, and a radio frequency (RF) module for transmitting and receiving an RF signal to and from an external part upon receiving a control signal from the processor. The processor receives out of service (OOS) mode information from a femto base station (FBS) by controlling the RF module, and determines whether to perform handover to the FBS, whether to re-enter a network of the FBS, or whether to perform handover from the FBS to a neighbor base station (BS) on the basis of the received OOS mode information. The OOS mode information is contained in any one of a predetermined Medium Access Control (MAC) message, an OOS signal and interworking signal (IWS) broadcast through a predetermined broadcast channel. The OOS mode information indicates an OOS mode status of the FBS according to satisfaction or non-satisfaction of a predetermined OOS mode operation condition.

The OOS mode status may include a normal status, an OOS mode operation status in which an air interface service is not provided to an arbitrary MS, a callback status indicating returning to the normal status, and an OOS mode initiation status indicating that the FBS enters the OOS mode after a lapse of a predetermined time.

The OOS mode information may include at least one of a bit indicating the OOS mode status and a bit indicating a cause of an OOS mode entry, and the OOS signal may include at least one of OOS start time information in which the FBS enters the OOS mode, OOS duration information in which the FBS is operated in the OOS mode, a list of neighbor base stations (BSs), and a list of recommended BSs.

The predetermined MAC message may be an Advanced Air Interface Self Organizing Network ADVertizement (AAI_SON-ADV) message, and the predetermined broadcast channel may be a super frame header (SFH).

If the DOS mode status is the DOS mode initiation status, the processor may perform handover to the neighbor BS. If the OOS mode status is the callback status or the normal status, the processor may perform either network re-entry for the FBS or handover to the FBS.

Advantageous Effects

Exemplary embodiments of the present invention have the following effects.

First, the embodiments of the present invention can implement effective communication.

Second, MSs can recognize an DOS mode operation status of an FBS using a variety of methods, such that they may not perform unnecessary handover to a corresponding FBS and a specific MS that has already received a service may perform handover to a neighbor BS.

Third, an MS, that leaves the FBS due to the OOS mode operation, can quickly perform network re-entry for the FBS through the callback method of the present invention.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

MODE FOR INVENTION

Figure 1:
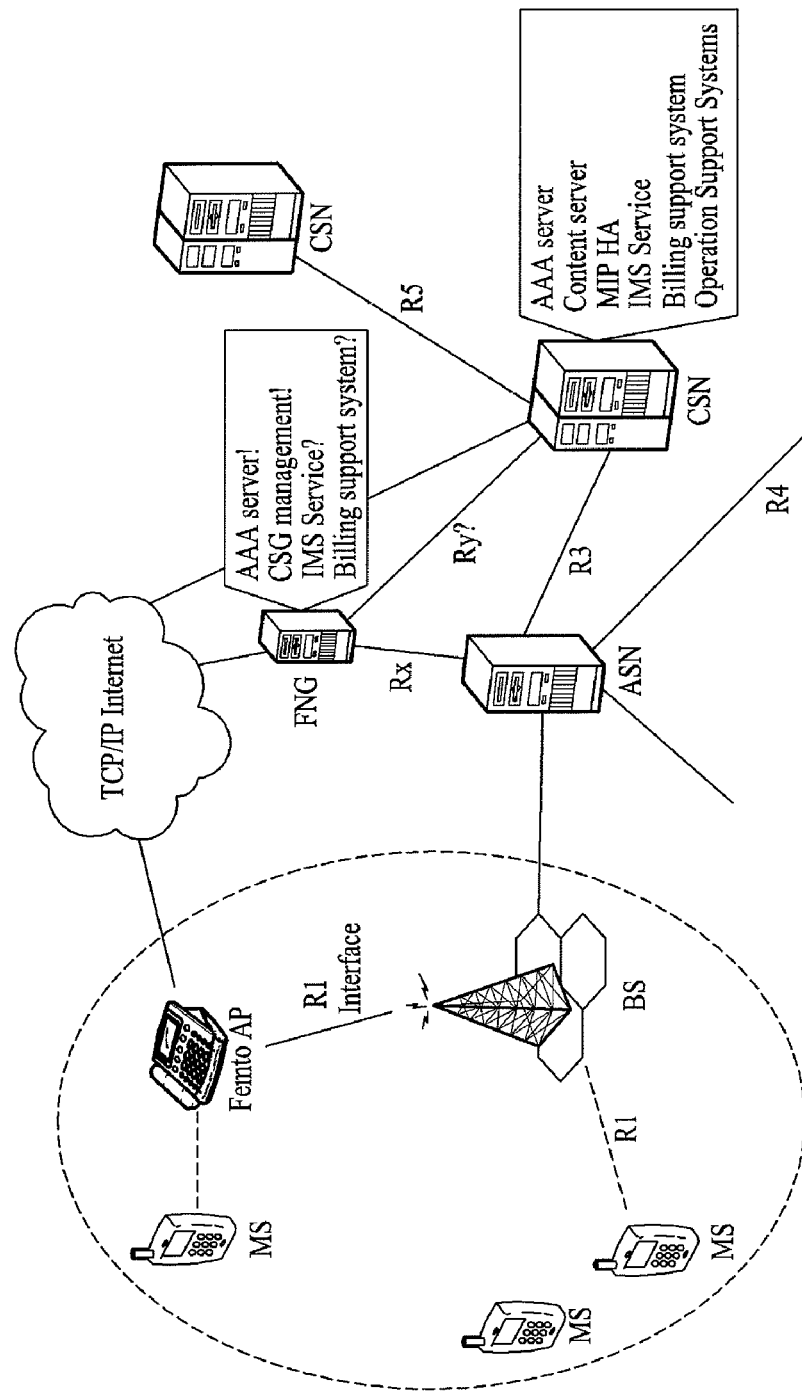
FIG. 1 is a conceptual diagram illustrating a conventional network structure including a femto network gateway (FNG).

The present invention relates to a wireless access system. The following exemplary embodiments of the present invention will disclose a variety of wireless access systems to which a femtocell is applied. In addition, the embodiments of the present invention disclose a method for effectively operating an OOS mode of a femto base station (FBS) and various methods for informing a mobile station (MS) of the operating method.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment. In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a BS and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc. The term 'MS' may be replaced with the term 'User Equipment (UE)', 'Subscriber Station (SS)', 'Mobile Subscriber Station (MSS)', 'mobile terminal', 'Advanced Mobile Station (AMS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc. Also, the MS may be any of a hand-held PC, a laptop computer, a smart phone, a MultiMode-MultiBand (MM-MB) terminal, etc.

The smart phone refers to a terminal taking the advantages of a mobile terminal and a personal portable terminal. It integrates data communication functions of the personal portable terminal, inclusive of schedule management, fax transmission and reception, Internet connection, etc. into the mobile terminal. The MM-MB terminal is a terminal that has an in-built modem chip and is capable of operating in a portable Internet system and other communication systems (e.g. CDMA 2000, WCDMA, etc.).

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, and P802.16Rev2 documents which are the standards of IEEE 802.16.

The detailed description, which will be given below with reference to the accompanying drawings, is intended to explain exemplary embodiments of the present invention, rather than to show only embodiments that can be implemented according to the present invention.

Specific terms used for the exemplary embodiments of the present invention are provided to help the understanding of the present invention. These specific terms may be replaced with other terms within the scope and spirit of the present invention.

Hereinafter, assumptions and operations, which are to be applied to an FBS, according to embodiments of the present invention will be described in detail.

First, a femtocell according to the present invention can construct an independent network having a relatively small cell radius, differently from a conventional cell. If it is assumed that a cell having a large cell radius is called a macro cell, the femtocell is connected to a general macro cell through a backbone connection and can communicate with the general macro cell using its own network capacity. One macro cell may include a plurality of femtocells. Differently from the general macro cell, the femtocell can be switched on or off. In order to reduce power consumption, the femtocell can be operated in a sleep mode or a low duty mode (LDM). In addition, the femtocell is unable to directly connect to other femto cells, such that it can be distinguished from a relay station.

In the meantime, the femtocell establishes synchronization with a macro cell to which the femtocell belongs. The femtocell may transmit an Inter-Working-Signal (IWS) in a frequency domain of the macro cell.

A method for searching for a femtocell using the IWS will hereinafter be described in detail.

Femto base stations (FBSs) using the same frequency domain may transmit the IWS using the same resources, and other FBSs using different frequency domains may transmit the IWS using different resources. A mobile station (MS) detects the IWS transferred from the FBSs, such that it searches for a specific frequency domain without additionally scanning different frequency domains, and thus detects femtocells that transmit the IWS through a corresponding frequency domain. In other words, FBSs belonging to an arbitrary macro BS use frequency domains different from that of the macro BS, and may broadcast the IWS to a frequency domain of a macro BS so as to inform an MS of the presence of such FBSs. The MS scans the frequency domain of the macro BS, such that it is impossible for the MS to recognize the presence of FBSs operating in other frequency domains so long as the MS separately scans other frequency domains. Therefore, the MS detects the IWS broadcast to a frequency domain of the macro BS, such that it can detect an FBS without additionally scanning a frequency domain of the FBS.

The IWS may be included in a super frame header (SFH), or may be broadcast through a separate MAC message. In addition, the IWS may be broadcast at intervals of an SFH-basis unit.

Figure 2:
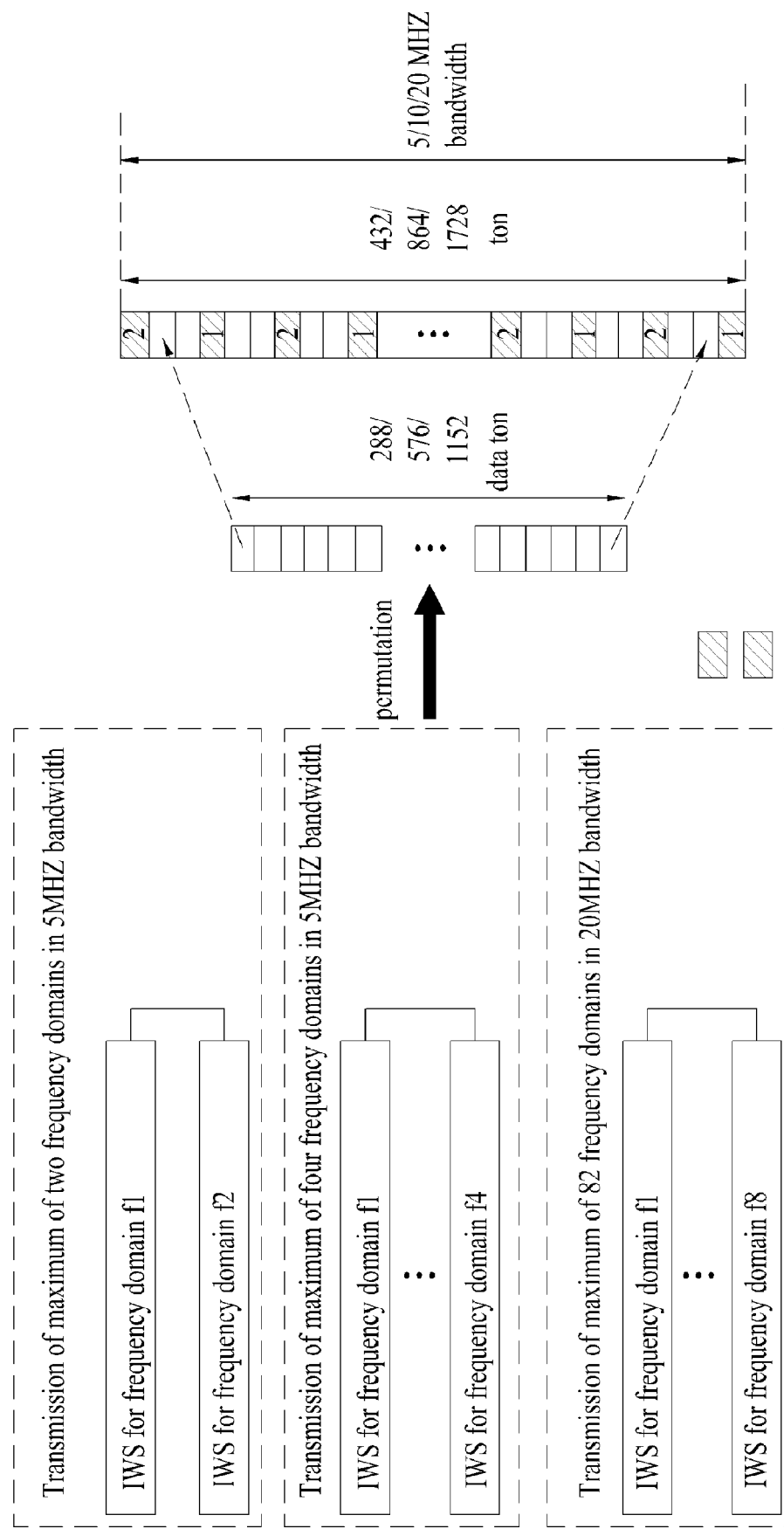
FIG. 2 is a conceptual diagram illustrating an Inter-Working-Signal (IWS) resource allocation scheme applicable to embodiments of the present invention.

In the above-mentioned proposed method, the IWS may have coverage similar to that of the SFH, and a resource allocation scheme thereof is shown in FIG. 2.

FIG. 2 is a conceptual diagram illustrating an IWS resource allocation scheme applicable to embodiments of the present invention.

Figure 3:
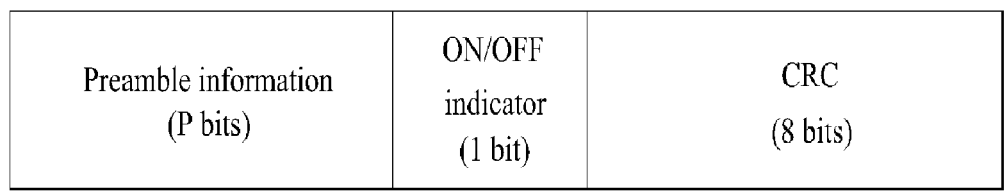
FIGS. 3(a) and 3(b) illustrate exemplary IWSs applicable to embodiments of the present invention.
Figure 3:
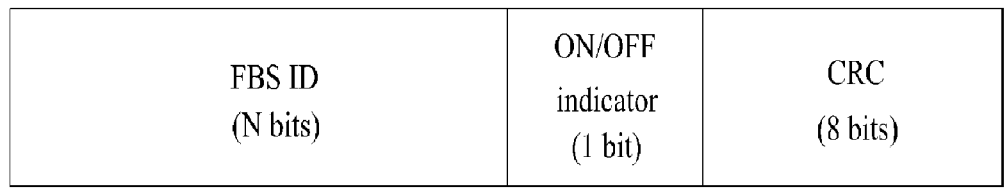

Referring to FIG. 2, assuming that a system bandwidth of 5 MHz is used, an MS can simultaneously search for femtocells of two frequency domains through a frequency division multiplexing (FDM)-based preamble signal. In this case, a total of 288 data tons may be used. As the system bandwidth is extended from 5 MHz to 10 MHz and 20 MHz, the number of frequency domains requisite for IWS transmission and the number of associated data tons may be linearly increased. The IWS format will be described with reference to FIG. 3.

FIGS. 3(a) and 3(b) illustrate exemplary IWSs applicable to embodiments of the present invention.

FIG. 3(a) shows an exemplary IWS provided when second layer (L2) information is required such that an MS starts handover to a femto BS or awakes a sleeping femto BS. Referring to FIG. 3(a), the IWS may include P-bit preamble information, an on/off indicator capable of indicating whether the femto BS is turned on or off using only one bit, and 8-bit cyclic redundancy check (CRC) information. Herein, specific information indicating whether the femto BS is turned on or off may indicate whether the femto BS is to be turned on or off after the lapse of a predetermined time.

FIG. 3(b) illustrates another exemplary IWS provided when second layer (L2) information is required such that an MS starts handover to a femto BS or awakes a sleeping femto BS. Referring to FIG. 3(b), the IWS may include N-bit FBS identifier (ID), an on/off indicator, and CRC information.

Next, a synchronous channel (SCH) will hereinafter be described in detail.

Generally, the SCH may have two usages, i.e., the SCH may be used to achieve physical synchronization, and may also be used to recognize segment information and a base station (BS) ID. In an IEEE 802.16e standard, two usages may be implemented as a preamble having the size of one symbol. In an IEEE 802.16m standard, the SCH is classified into a primary SCH (PSCH) for physical synchronous and a secondary SCH (SSCH) for segment information and a BS ID. A channel for the second usage is classified into 3k, 3k+1, and 3k+2 (k=0, 1, . . . , N−1, and 3(N−1)+2≦Number of subcarriers to be used) such that it discriminates three segments from one another. N orthogonal sequences for each segment are used, such that a BS ID and the like can be identified according to a code division multiplexing (CDM) scheme. Herein, the term 'segment' may represent three sector IDs when three sectors are used.

Out Of Service (OOS) Mode Information

Based on the above-mentioned description, an OOS mode of a femto BS (FBS) will hereinafter be described in detail.

The OOS mode may indicate a specific status in which a specific condition is satisfied such that a normal service is not provided to an MS. For example, the OOS mode may indicate a disable downlink air interface transmitter status.

The FBS may enter an OOS mode when at least one of the following conditions 1) to 4) is satisfied.

1) Planned FBS Shutdown: Under the condition that an FBS shutdown time is pre-recognized according to a predetermined schedule or how many hours are needed for FBS shutdown, the FBS enters an OOS mode at a predetermined time. For example, an example of such planned FBS shutdown may be rebooting of an FBS.

2) Unexpected Power-Off: Due to an unexpected cause, for example, a power failure, an FBS may be powered off, such that it may enter an OOS mode.

3) Unexpected Backhaul Link Disconnection Backhaul link for communicating with a network is severed due to the occurrence of an unexpected cause, such that an FMS may enter an OOS mode.

4) Unexpected FBS failure: Due to user's careless handling or natural disaster, an FBS is broke down such that it enters an OOS mode.

If any one of the above-mentioned conditions 1) to 4) is satisfied, an FBS may enter an OOS mode. However, before an FBS enters the OOS mode, the FBS should pre-inform an MS, that is receiving a service from the FBS, of the entrance into an OOS mode. A method for allowing the FBS to inform the MS of the entry into the OOS mode will hereinafter be described with reference to FIG. 4. For convenience of description and better understanding of the present invention, specific information indicating the entry into the OOS mode of the FBS, an entry time, a duration, and the like is hereinafter referred to as 'OOS mode information', and a signal needed for transmitting the OOS mode information to an MS is hereinafter referred to as an 'OOS signal'.

Figure 4:
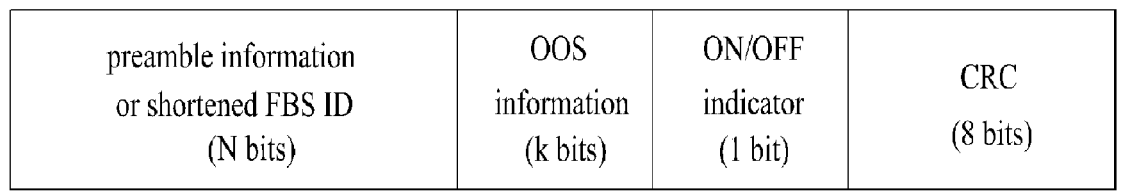
FIG. 4 illustrates an example of an Out Of Service (OOS) signal that can inform a mobile station (MS) of OOS mode information of a femto base station (FBS) according to an exemplary embodiment of the present invention.

FIG. 4 illustrates an example of an OOS signal that can inform an MS of OOS mode information of an FBS according to an exemplary embodiment of the present invention.

Referring to FIG. 4, the OOS signal may further include OOS mode information in the above-mentioned IWS. The OOS mode information may be comprised of a plurality of bits. If the OOS mode information indicates that an FBS enters an OOS mode, the OOS signal may further include OOS start time information and OOS duration information. In addition, the OOS signal may further include information of a recommended BS so as to support handover of a corresponding MS because the MS belonging to a femtocell cannot receive a necessary service from the FBS any longer.

The following embodiments of the present invention propose two kinds of OOS mode information 1) and 2).

1) First OOS mode information may be comprised of 5 bits (bit #1~bit #5) except for OOS start time information and OOS duration information.

Bit #1: Bit #1 is used as an OOS indicator. If the bit #1 is set to 1, this means that a current mode is an OOS mode. Alternatively, if the bit #1 is set to zero '0', this means that a current status is a normal status.

Bit #2: Bit #2 is used to indicate a backbone network data link status. If the bit #2 is set to 1, this means that data communication is made unavailable because of a faulty operation in a backbone link. Alternatively, if the bit #2 is set to zero '0', this means a normal status.

Bit #3: Bit #3 is used to indicate a backbone network control link status. If the bit #3 is set to 1, this means that a faulty operation occurs in network entities that include an overlay macro BS and control an FBS such that communication is made unavailable. Alternatively, if the bit #3 is set to zero '0', this means a normal status.

Bit #2 or Bit #3 may be used to indicate a backbone network link status. The added result of Bit #2 and Bit #3 may indicate a control/data link status using only one bit.

Bit #4: Bit #4 is used to indicate shutdown of main power. If Bit #4 is set to 1, this means that a faulty operation or failure occurs in main power such that an FBS is operated by auxiliary power (e.g., battery). Alternatively, if the bit #4 is set to zero '0', this means a normal status such that no faulty operations occur in FBS power.

Bit #5: Bit #5 is used to indicate a warning status of FBS power shutdown. If Bit #5 is set to 1, this means that main/auxiliary power is immediately shut down or an FBS is powered off according to a predetermined management schedule. Otherwise, if Bit #5 is set to zero '0', this means a normal status.

2) Second OOS mode information may be comprised of bits (Bit #1~Bit #4) except for OOS start time information and OOS duration information.

Bit #1 and Bit #2 may indicate an FBS OOS status type (or OOS type) or an FBS action type.

If each of Bit #1 and Bit #2 is set to 0x00, this means that a current FBS is in a normal status.

If each of Bit #1 and Bit #2 is set to 0x01, this means that a current FBS is in progress of a callback procedure returning to a normal status.

If each of Bit #1 and Bit #2 is set to 0x10, this means that a current FBS is in progress of an OOS mode. Namely, Bit #1 or Bit #2 of 0x10 means that a current FBS is in an active status of the OOS mode. Although an unexpected problem occurs in a backbone link status of an FBS, Bit #1 or Bit #2 of 0x10 can be transmitted under an FBS operable status. In other words, Bit #1 or Bit #2 of 0x10 may indicate that a necessary service cannot be provided to an MS even though an air interface of an FBS is activated.

If each of Bit #1 and Bit #2 is set to 0x11, this means that a current FBS is going to enter an OOS mode.

Bit #3 or Bit #4 may indicate an OOS reason type.

If each of Bit #3 and Bit #4 is set to 0x00, this means that data communication is made unavailable due to a faulty operation of a backbone link.

If each of Bit #3 and Bit #4 is set to 0x01, this means that a faulty operation occurs in network entities that include an overlay macro BS and control an FBS such that it is impossible to achieve communication among such network entities.

If each of Bit #3 and Bit #4 is set to 0x10, this means the shutdown of main power such that an FBS is operated by battery power serving as auxiliary power due to a faulty operation of main power.

Method for Transmitting OOS Mode Information

In one example, an FBS may include the OOS signal or the OOS mode information in a predetermined broadcast channel signal (e.g., super frame header (SFH)), and then broadcast the resultant broadcast channel signal at intervals of a predetermined time (e.g., at every SFH). In another example, an FBS may also broadcast the OOS signal or the OOS mode information through a predetermined MAC message. As an example of such an MAC message, an Advanced Air Interface Self Organizing Network ADVertizement (AAI_SON-ADV) message may be used.

Detailed Embodiments

A method for transmitting an OOS signal of an FBS and an MS operation for the same will hereinafter be described with reference to FIGS. 5 to 7.

Figure 5:
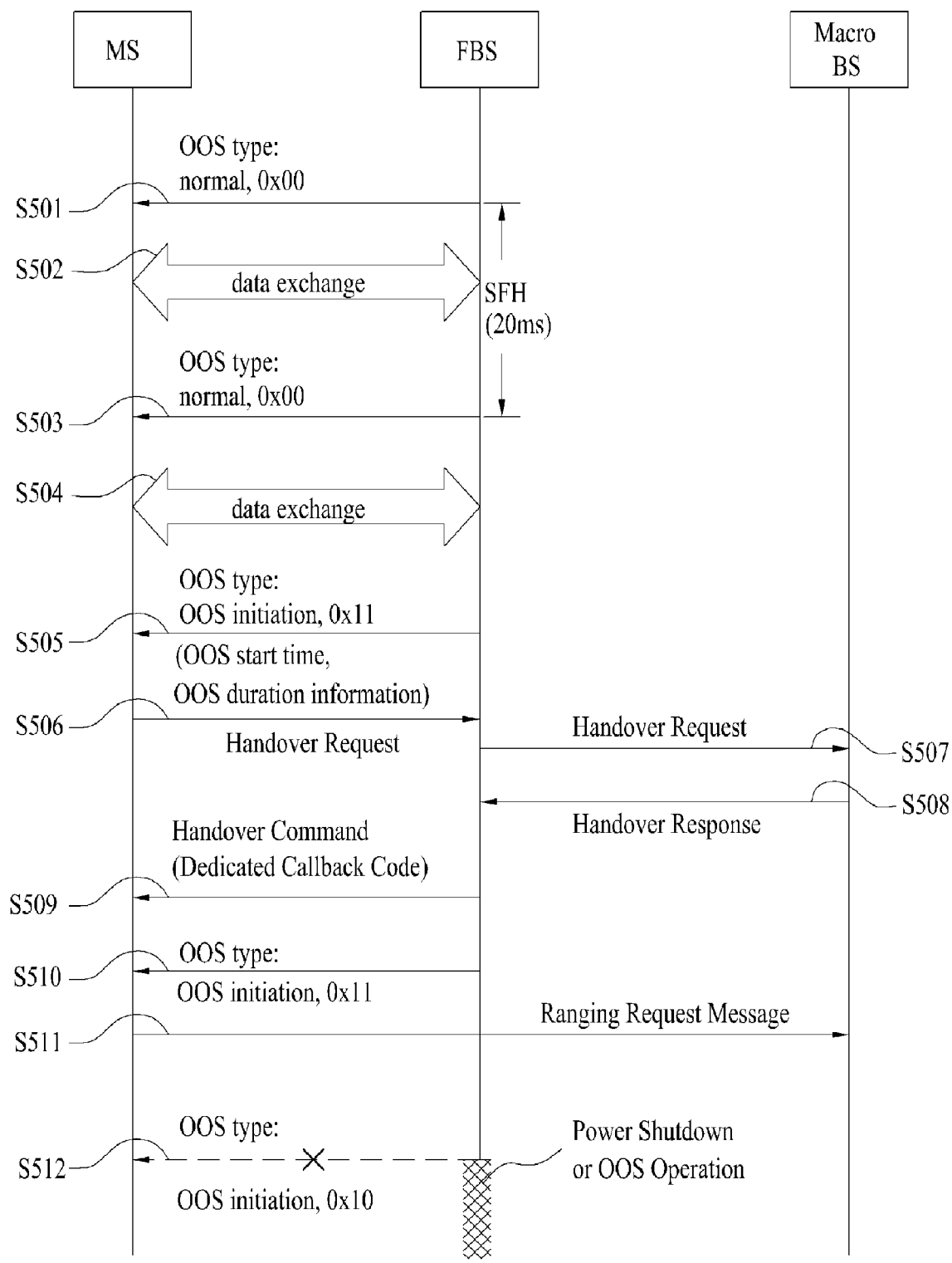
FIG. 5 is a flowchart illustrating a method for enabling an MS to perform handover when an FBS enters an OOS mode according to an exemplary embodiment of the present invention.

FIG. 5 is a flowchart illustrating a method for enabling an MS to perform handover when an FBS enters an OOS mode according to an exemplary embodiment of the present invention.

FIG. 5 shows a second type (where k=4) between the above-mentioned two OOS mode information types. In FIG. 5, it is assumed that an MS receives a service from an FBS.

Referring to FIG. 5, an FBS may broadcast an OOS signal including OOS mode information to an MS such that an OOS mode-associated status of the FBS can be periodically provided to the MS. If the FBS is operated in a normal mode, each bit (e.g., Bit #1 and Bit #2) indicating an OOS type is set to 0x00, such that the OOS signal may be broadcast to the MS at step S501.

While the FBS is operated in the normal mode, the MS may exchange data with the FBS at step S502.

The FBS may broadcast an OOS signal to the MS on a superframe basis, and may normally communicate with the MS at steps S503 and S504.

The FBS may start or initiate the OOS mode if any one of the above-mentioned OOS mode entry conditions is satisfied. The FBS may set a specific bit indicating the OOS type to a specific value (e.g., 0x11) indicating the beginning of the OOS mode, and may broadcast the OOS signal to the MS at step S505.

In this case, the OOS signal may include OOS start time information and OOS duration information. In more detail, the FBS may start operation in an OOS mode at the OOS start time, and the OOS duration may be duration of an OOS mode.

The MS receives the OOS signal such that it can recognize that the FBS is to be operated in an OOS mode during the OOS duration starting from the OOS start time.

Therefore, it is recognized that the MS cannot continuously receive a service from the FBS, such that a handover from the MS to the macro BS is decided, and a handover request message is transmitted to the FBS at step S506.

Although the embodiments of the present invention assume the handover to the macro BS, the scope or spirit of the present invention is not limited thereto, and the MS can be handed over to any of femtocell's neighbor BSs capable of providing a service to a corresponding MS. If a list of neighbor BSs or a list of recommended BSs is contained in the OOS signal, the MS may decide a handover-target BS by referring to the lists.

The FBS having received a handover request message from the MS may transfer the handover request message to the macro BS at step S507. In response to the handover request message, the macro BS may transfer a handover response message to the FBS at step S508.

The FBS having received the handover response message may transfer a handover command message to the MS. In this case, the handover command message may transmit a dedicated callback CDMA code to the MS, such that the MS can easily re-enter the femtocell when the FBS is normally re-operated. The dedicated callback code will be described in detail. However, although FIG. 5 shows that an advanced mobile station (AMS) initiates handover (HO), it should be noted that the FBS may initiate handover (HO).

The FBS may periodically broadcast an OOS signal to the MS until a current time reaches a specific time indicated by OOS start time information at step S510. In this case, each broadcast OOS signal may include OOS start time information and OOS duration information.

If the MS receives the handover (HO) command message, it may transmit a ranging request message to the macro BS so as to perform handover (HO) to the macro BS at step S511. In this case, prior to transmitting the ranging request message, the MS may also transmit a handover indication message to the FBS (not shown).

At the OOS start time, the FBS may be operated in an OOS mode. In this case, if the problem (e.g., a backbone network link problem) encountered in the FBS does not cause the OOS mode, an air interface of the FBS can be normally operated. In order to inform the MS that the FBS is operated in the OOS mode, the FBS sets a bit indicating an OOS type to a value (e.g., 0x10) indicating that the FBS is operated in the OOS mode, such that the FBS can broadcast the OOS signal to the MS at step S512.

A callback operation of the FBS will hereinafter be described with reference to FIG. 6.

Figure 6:
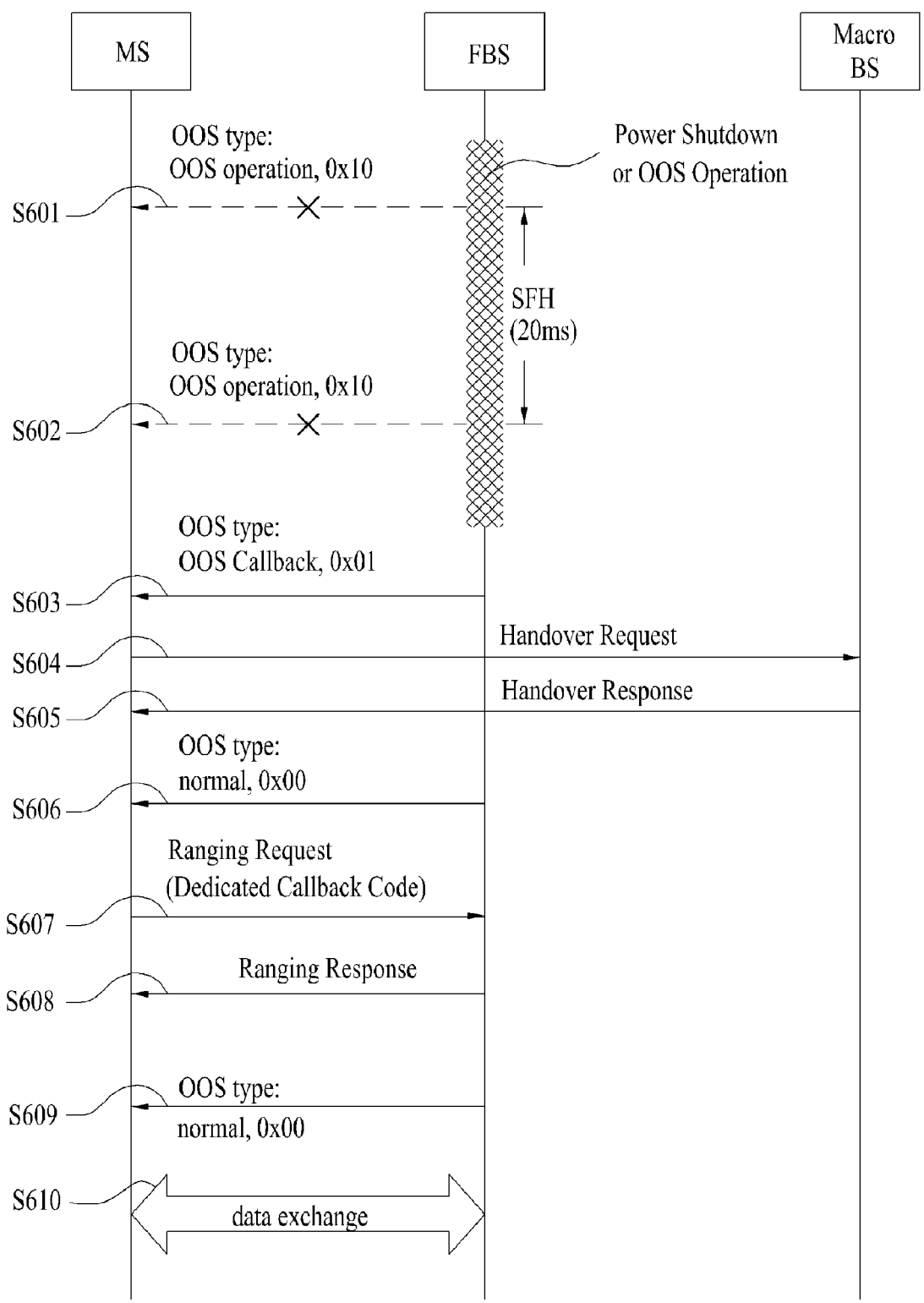
FIG. 6 is a flowchart illustrating a method for enabling an MS to re-perform handover to an FBS after an OOS mode of the FBS is ended.

FIG. 6 is a flowchart illustrating a method for enabling an MS to re-perform handover to an FBS after an OOS mode of the FBS is ended.

For convenience of description and better understanding of the present invention, it is assumed that the situation of FIG. 6 is continued from FIG. 5.

As previously stated in FIG. 5, the FBS can be operated in the OOS mode in the range from a first time indicated by the OOS start time information to a second time indicated by the OOS duration information. When the air interface of the FBS is activated during the OOS mode, the FBS sets a bit indicating an OOS type to a specific value (e.g., 0x10) indicating that the FBS is operated in the OOS mode in such a manner that the FBS can periodically inform the MS that the FBS is operated in the OOS mode, such that it can broadcast the OOS signal at steps S601 and S602.

If a duration indicated by the OOS duration information expires or a service can be normally performed, the FBS sets a bit indicating an OOS type to a specific value (e.g., 0x01) indicating an OOS mode callback, such that it can broadcast the OOS signal to the MS at step S603.

The MS may scan a frequency domain of a corresponding FBS, such that it can determine whether to receive again the service from the FBS after the lapse of a predetermined time (e.g., the predetermined time ranges from a time point indicated by the OOS start time information to the other time point (i.e., a callback time) indicated by the OOS duration time information). In this case, if the MS receives the OOS signal from the FBS at step S603, it can recognize that a callback operation toward a corresponding FBS can be carried out.

Therefore, the MS may decide handover to the FBS, and may transmit a handover request message to the macro BS at step S604.

In response to the handover request message, the macro BS may transmit a handover response message to the MS at step S605.

In the meantime, if the FBS returns to the normal status, it sets the bit indicating the OOS type to a specific value (e.g., 0x00) indicating the normal status, such that it can broadcast the OOS signal at step S606.

In order to perform handover to the FBS, the MS may transmit a ranging request message to the FBS at step S607. In this case, upon receiving the dedicated callback code in the same manner as in the step S509 of FIG. 5, the MS transmits a dedicated callback code instead of the ranging request message so as to simplify a handover procedure.

In response to the message or code of the step S607, the FBS may transmit a ranging response message to the MS at step S608.

Since the FBS is operated in the normal mode, it can periodically broadcast the OOS signal shown in step S606 (step S609).

The MS and the FBS can normally communicate with each other after completing the handover procedure.

Meanwhile, the FBS may announce the OOS mode status to neighbor parts by adding the OOS mode information to the IWS. Generally, this announcement can be effectively used for two purposes.

A first purpose is as follows. The FBS can inform MSs, that are located in the vicinity of the FBS at a callback time although they are not connected to the FBS when the FBS enters the OOS mode, of the FBS redriving through the IWS.

A second purpose is as follows. The FBS that is operated in the OOS mode informs neighbor MSs of the FBS OOS mode operation status through the IWS, such that it can prevent the MSs from being unnecessarily handed over to a corresponding FBS.

First, a first case related to the first purpose will hereinafter be described with reference to FIG. 7.

Figure 7:
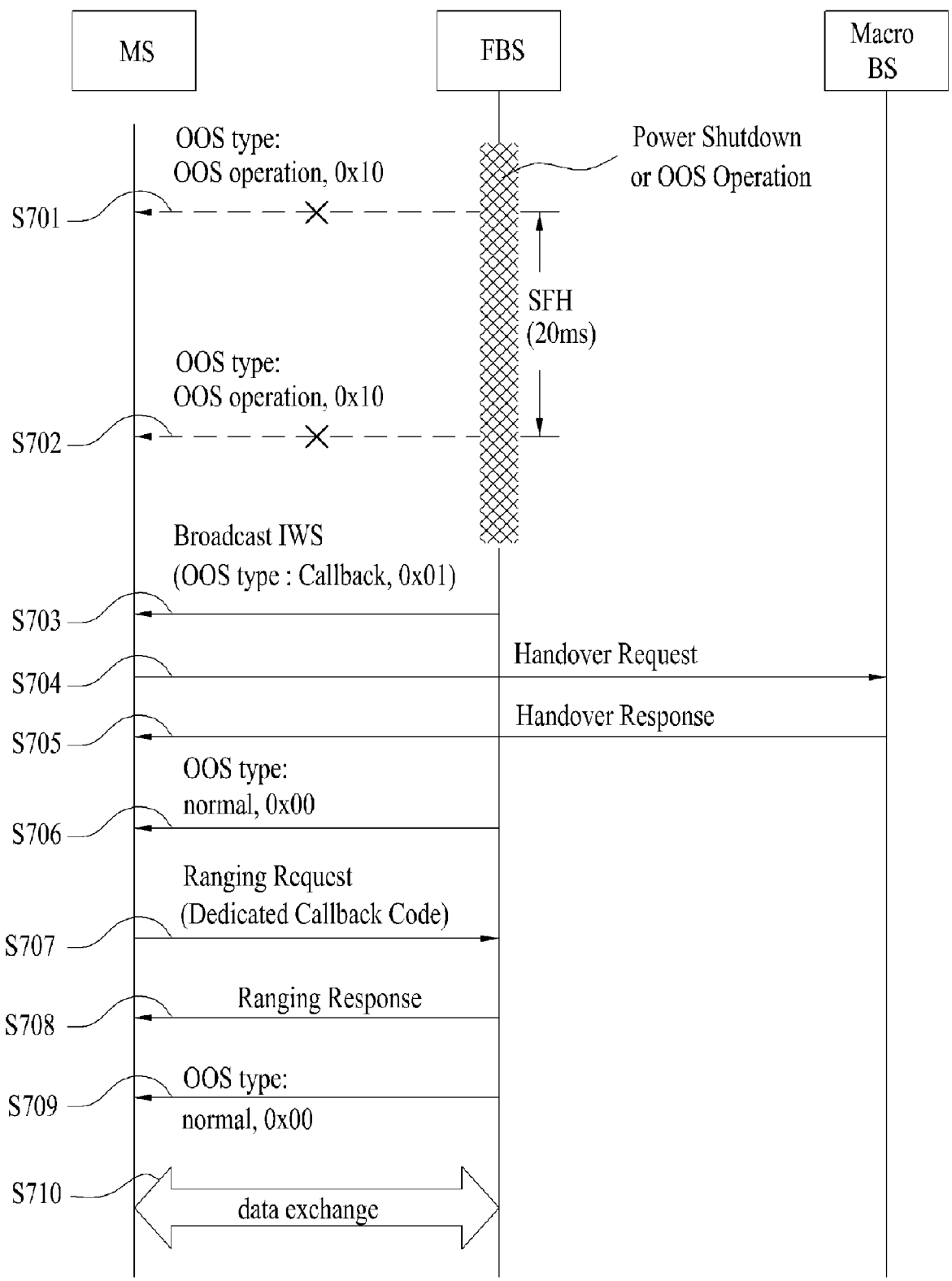
FIG. 7 is a flowchart illustrating an example of a callback operation using an interworking signal of an FBS according to an exemplary embodiment of the present invention.

FIG. 7 is a flowchart illustrating an example of a callback operation using an IWS of an FBS according to an exemplary embodiment of the present invention.

For convenience of description and better understanding of the present invention, it is assumed that the situation of FIG. 7 is also continued from FIG. 5 in a similar way to FIG. 6.

As previously stated in FIG. 5, the FBS can be operated in the OOS mode in the range from a first time indicated by the OOS start time information to a second time indicated by the OOS duration information. When the air interface of the FBS is activated during the OOS mode, the FBS sets a bit indicating an OOS type to a specific value (e.g., 0x10) indicating that the FBS is operated in the OOS mode in such a manner that the FBS can periodically inform the MS that the FBS is operated in the OOS mode, such that it can broadcast the OOS signal at steps S701 and S702. If a duration indicated by the OOS duration information expires or a service can be normally performed, the FBS sets a bit indicating an OOS type to a specific value (e.g., 0x01) indicating an OOS mode callback, such that it can broadcast the IWS to a frequency domain of the macro BS at step S703.

Therefore, although the frequency domain of the FBS is different from that of the macro BS, the MS receives the IWS from the FBS without additionally scanning the frequency domain of the FBS, such that it can recognize a current status of the FBS through the IWS.

Steps S704 to S710 of FIG. 7 are similar to steps S604 to S610 of FIG. 6, and as such detailed description thereof will herein be omitted for convenience of description.

Next, a second case related to the second purpose will hereinafter be described with reference to FIG. 8.

Figure 8:
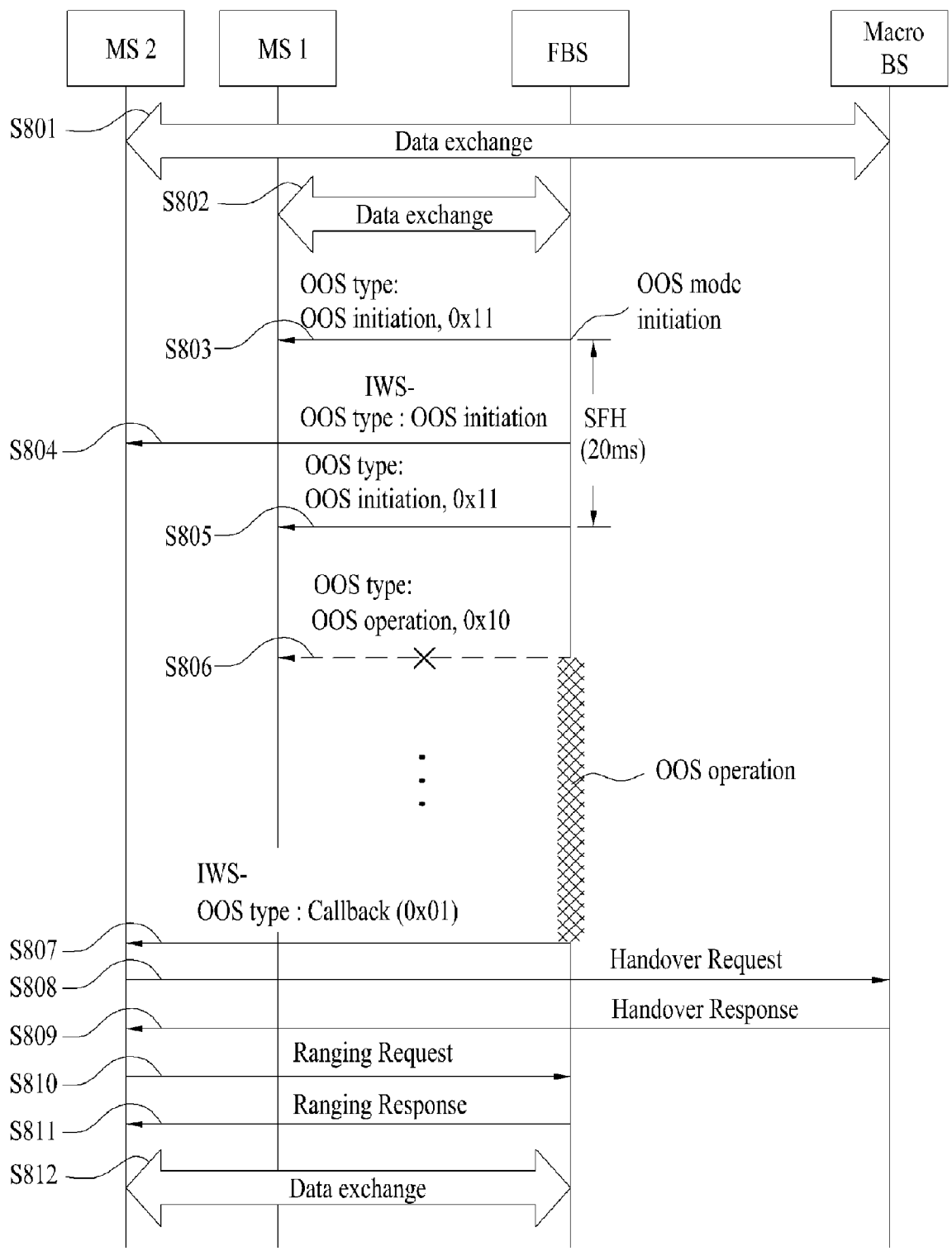
FIG. 8 is a flowchart illustrating another example of a callback operation using an interworking signal of an FBS according to an exemplary embodiment of the present invention.

FIG. 8 is a flowchart illustrating another example of a callback operation using an IWS of an FBS according to an exemplary embodiment of the present invention.

Referring to FIG. 8, a first MS (MS 1) receives a service from an FBS and a second MS (MS 2) receives a service from a macro BS at steps S801 and S802.

In this case, if a predetermined condition for the OOS operation is satisfied in the FBS, the FBS sets a bit indicating an OOS type to a specific value indicating OOS initiation, such that it can broadcast the OOS signal at step S803.

In this case, the OOS signal may include OOS start time and OOS duration information.

In the meantime, if the FBS informs each MS, that is located in the vicinity of the FBS whereas it does not receive the service from the FBS, of FBS status information (i.e., the OOS mode initiation), it can prevent the occurrence of unnecessary handover. In order to prevent such unnecessary handover, the FBS may include the OOS mode information in the IWS, and broadcast the resultant IWS to the frequency domain of the macro BS at step S804.

In this case, the IWS may further include OOS start time information and OOS duration information. Therefore, MS 2 receives an IWS such that it recognizes that the FBS enters the OOS mode and does not attempt to perform unnecessary handover to the FBS.

Thereafter, the FBS may broadcast the OOS signal at intervals of a predetermined time (e.g., at every SFH), such that it can inform the MS that the FBS is going to perform the OOS mode initiation at step S805.

If a current time reaches the OOS start time, the FBS may be operated in the OOS mode. In this case, if the problem (e.g., a backbone network link problem) encountered in the FBS does not cause the OOS mode, an air interface of the FBS can be normally operated. In order to inform the MS that the FBS is operated in the OOS mode, the FBS sets a bit indicating an OOS type to a specific value (e.g., 0x10) indicating that the FBS is operated in the OOS mode, such that the FBS can broadcast the OOS signal to the MS at step S806.

If a predetermined time from a time point indicated by the OOS start time information to a time point indicated by the OOS duration information has elapsed, i.e., if a current times reaches a callback time, the FBS sets a bit indicating the OOS type to a specific value (e.g., 0x01) indicating a callback operation, and broadcasts the bit to a frequency domain of the macro BS through the IWS at step S807. Therefore, MS 2, that receives a service from the macro BS, can recognize that the FBS is re-operated in the OOS mode, and can transmit a handover request message to the macro BS so as to perform handover to the FBS at step S808.

In response to the handover request message of the MS, the macro BS may transmit a handover response message to the MS at step S809.

Thereafter, MS 2 may transmit a ranging request message to the FBS at step S810, and the FBS may transmit a ranging response message to the ranging request message to the MS 2 at step S811.

The MS 2 and the FBS can normally communicate with each other after completing the handover procedure at step S812.

An MS and an FBS (or MBS) for implementing the above-described embodiments according to an exemplary embodiment of the present invention will be described below.

The MS operates as a transmitter on an uplink and as a receiver on a downlink, whereas the BS operates as a receiver on the uplink and as a transmitter on the downlink. Therefore, each of the MS and the BS may have a transmitter and a receiver for transmitting and receiving information or data.

Each of the transmitter and the receiver may include a processor, modules, parts and/or means for performing the exemplary embodiments of the present invention. Particularly, the transmitter and the receiver may include modules (or means) for encrypting messages, modules for interpreting encrypted messages, and antennas for transmitting and receiving messages. An example of the transmitter and the receiver will be described with reference to FIG. 9.

Figure 9:
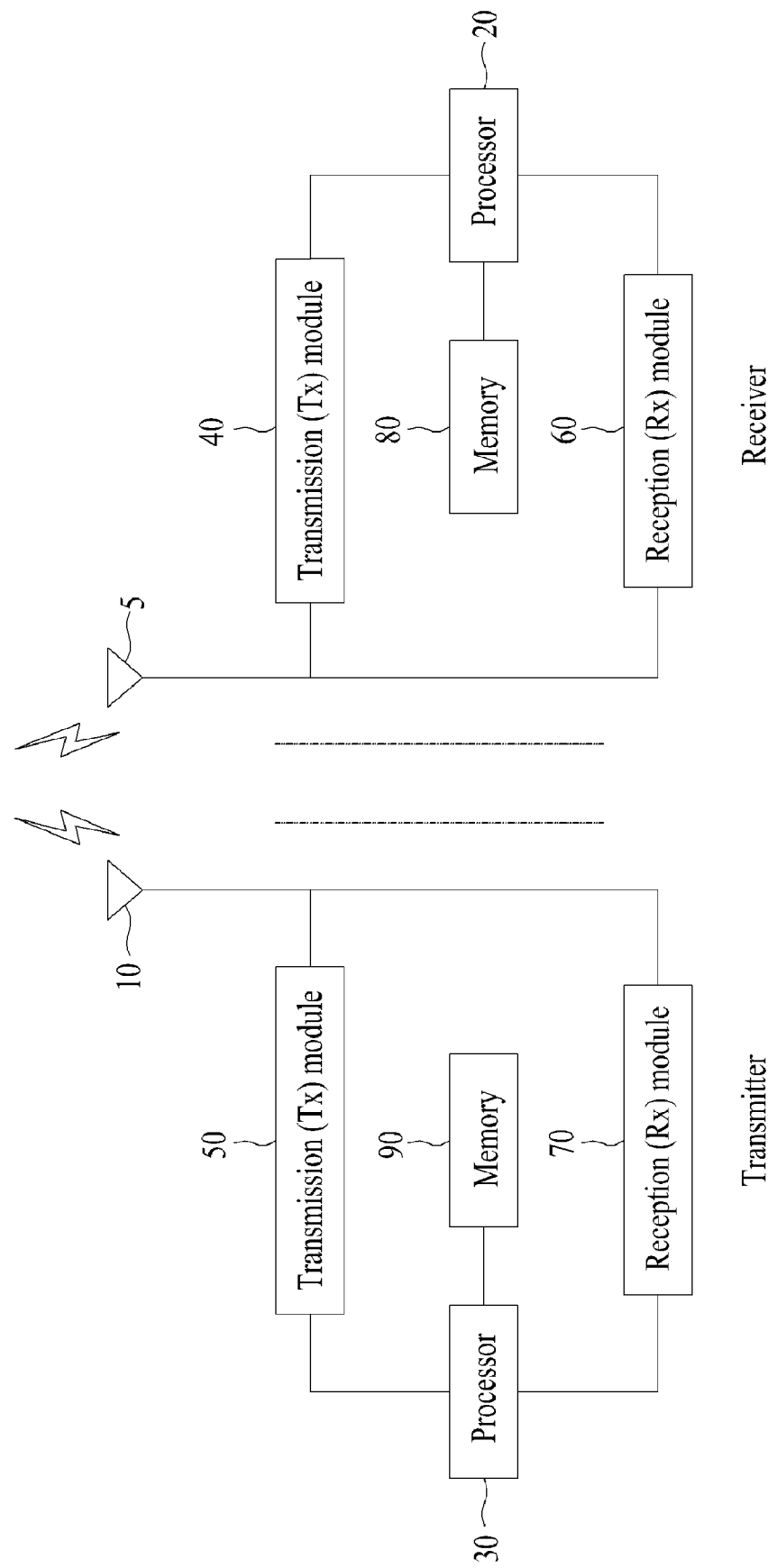
FIG. 9 is a block diagram of a transmitter and a receiver according to an exemplary embodiment of the present invention.

FIG. 9 is a block diagram of a transmitter and a receiver according to an exemplary embodiment of the present invention.

Referring to FIG. 9, the structures of the transmitter and the receiver are illustrated on the left and right sides of FIG. 9, respectively. Each of the receiver and the transmitter may include an antenna 5 or 10, a processor 20 or 30, a Transmission (Tx) module 40 or 50, a Reception (Rx) module 60 or 70, and a memory 80 or 90. Each component of the transmitter operates in correspondence with its counterpart of the receiver.

The antennas 5 and 10 transmit Radio Frequency (RF) signals generated from the Tx modules 40 and 50 in the air interface, or receive RF signals in the air interface and output the received RF signals to the Rx modules 60 and 70. When Multiple Input Multiple Output (MIMO) is supported, two or more antennas may be used.

An antenna, a Tx module and an Rx module may collectively form an RF module.

The processors 20 and 30 provide overall control to the MS. For example, the processors 20 and 30 may perform a control function, a MAC frame conversion control function based on service characteristics and propagation environments, a handover function, authentication, and encryption in order to perform the afore-described exemplary embodiments.

Especially, a processor of the MS controls the RF module, receives an IWS or a predetermined MAC message (e.g., an AAI_SON-ADV message) from the FBS, or receives an OOS signal that is transmitted at intervals of a predetermined time over a predetermined broadcast channel (e.g., SFH), such that it can obtain OOS mode information contained in the received signal. The OOS mode information type and a method for transmitting the same are identical to those of the above-mentioned embodiments of the present invention, and as such detailed description thereof will herein be omitted for convenience of description.

Upon receiving the OOS mode information, the processor can recognize an OOS mode status (i.e., an OOS type) of an FBS, an OOS duration of the FBS, a reason why the FBS enters the OOS mode, and the like. Therefore, the process can decide whether to perform handover to a corresponding FBS, whether to perform network re-entry for the FBS, or whether to perform handover to a macro BS.

In addition, the processor of the FBS can determine whether an OOS mode entry condition is satisfied, such that it sets a bit of appropriate OOS mode information and broadcasts the bit to one or more neighbor BSs using the above-mentioned method. In addition, the processor of the FBS determines that the FBS enters the OOS mode, such that it sets a cell-bar bit of the SFH to '1' so as to prevent an unnecessary access attempt of the MS.

Also, the processor of the BS interprets the MAC message or data transmitted from the MS, such that it performs allocation of uplink resources required for the MS. The processor generates an uplink grant for informing the MS of allocation content, such that it may perform scheduling to transmit the uplink grant.

The Tx modules 40 and 50 may transmit data scheduled by the processors 20 and 30 to the antennas 5 and 10, after a predetermined coding and modulation.

The Rx modules 60 and 70 may recover original data by decoding and demodulating RF signals received through the antennas 5 and 10 over the air interface and output the original data to the processors.

The memories 80 and 90 may store programs for processing and control operations of the processors 20 and 30 and temporarily store input/output data (e.g. scanning results or a neighbor list). Also, the memories 80 and 90 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, and optical disk.

The BS may perform, in at least one of the above-described modules or in a separately procured means, module or part, a control function according to the embodiments of the present invention, an Orthogonal Frequency Division Multiple Access (OFDMA) packet scheduling, Time Division Duplex (TDD) packet scheduling, channel multiplexing, a variable MAC frame control function based on service characteristics and a propagation environment, a real-time high-speed traffic control function, a handover function, an authentication and encryption function, a packet modulation and demodulation function for data transmission and reception, a high-speed packet channel coding function, and a real-time modem control function.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

[Industrial Applicability]

As apparent from the above description, the embodiments of the present invention can provide a method for effectively informing an MS of an FBS OOS mode operation and an FBS OOS status in a broadband wireless access system including a femtocell, and an MS for the same. Although the method and the MS of the embodiments of the present invention have been disclosed on the basis of only an IEEE 802.16m system application, it should be noted that the embodiments are also applicable not only to an IEEE 802.xx system but also to other wireless mobile communication systems each having a femto BS (FBS).

What is claimed is:

1. A method for operating an out of service (OOS) mode of a femto base station (FBS) in a broadband wireless access system, the method comprising:

determining whether a predetermined OOS mode initiation condition is satisfied;

broadcasting OOS mode information indicating an initiation of the OOS mode of the FBS via a broadcast medium access control (MAC) message, if the OOS mode initiation condition is satisfied; and setting a bit for preventing a mobile station entry or re-entry on a predetermined broadcast channel which is broadcast periodically before entering the OOS mode, wherein the OOS mode information further comprises at least one of action type information indicating the OOS mode, reason information indicating a reason of the OOS mode initiation, OOS start time information in which the FBS starts the OOS mode, OOS time interval information during which the FBS is operated in the OOS mode, and a list of recommended BSs, wherein the corresponding OOS mode information is included in the broadcast MAC message, and wherein the broadcast MAC message is an Advanced Air Interface Self Organizing Network ADVertizement (AAI-SON-ADV) message, and the predetermined broadcast channel is a super frame header (SFH).

2. The method according to claim 1, further comprising disabling an air interface after the broadcast of the MAC message.

3. The method according to claim 1, wherein the OOS mode initiation condition comprises at least one of power down of the FBS, backhaul link down of the FBS, and connection lost with a service network.

4. An out of service (OOS) mode operating method for operating a mobile station (MS) according to an OOS mode of a femto base station (FBS) in a broadband wireless access system, the method comprising:

receiving OOS mode information indicating OOS mode initiation of the FBS via a broadcast medium access control (MAC) message, and a predetermined broadcast channel including a bit for preventing a mobile station entry or re-entry; and performing a handover to a neighbor base station (BS) of the FBS based on the OOS mode information in the received broadcast MAC message, wherein the predetermined broadcast channel is periodically broadcast from the FBS, wherein the OOS mode information further comprises at least one of action type information indicating the OOS mode, reason information indicating a reason of the OOS mode initiation, OOS start time information in which the FBS starts the OOS mode, OOS time interval information during which the FBS is operated in the OOS mode, and a list of recommended BSs, wherein the corresponding OOS mode information is included the broadcast MAC message, and wherein the broadcast MAC message is an Advanced Air Interface Self Organizing Network ADVertizement (AAI-SON-ADV) message, and the predetermined broadcast channel is a super frame header (SFH).

5. A mobile station (MS) comprising:

a processor; and a radio frequency (RF) module for transmitting and receiving RF signals, under the control of the processor, wherein the processor is configured to:
   receive out of service (OOS) mode information indicating OOS mode initiation of a femto base station (FBS) via a broadcast medium access control (MAC) message and a predetermined broadcast channel including a bit for preventing a mobile station entry or re-entry, and
   determine whether to perform a network re-entry with the FBS, or whether to perform a handover from the FBS to a neighbor base station based on the OOS mode information in the received broadcast MAC message,
   wherein the predetermined broadcast channel is periodically broadcast from the FBS,
wherein the OOS mode information further comprises at least one of
   action type information indicating the OOS mode,
   reason information indicating a reason of the OOS mode initiation,
   OOS start time information in which the FBS starts the OOS mode,
   OOS time interval information during which the FBS is operated in the OOS mode, and
   a list of recommended BSs,
wherein the corresponding OOS mode information is included in the broadcast MAC message, and
   wherein the broadcast MAC message is an Advanced Air Interface Self Organizing Network ADVertizement (AAI-SON-ADV) message, and the predetermined broadcast channel is a super frame header (SFH).

* * * * *